United States Patent
Poulo et al.

[11] Patent Number: 6,002,525
[45] Date of Patent: Dec. 14, 1999

[54] CORRECTING LENS DISTORTION

[75] Inventors: Richard J. Poulo, Beaverton; Walter L. Gorman, Portland, both of Oreg.

[73] Assignee: Intel Corporation, Santa Clara, Calif.

[21] Appl. No.: 09/110,805

[22] Filed: Jul. 6, 1998

[51] Int. Cl.$^6$ .................................................. G02B 3/00
[52] U.S. Cl. ................................... 359/642; 382/254
[58] Field of Search ............................. 359/642; 382/292, 382/254, 255, 275; 345/427, 425, 436

[56] References Cited

U.S. PATENT DOCUMENTS

| | | | |
|---|---|---|---|
| 4,298,944 | 11/1981 | Stoub et al. | 364/515 |
| 5,878,174 | 3/1999 | Stewart et al. | 382/254 |

Primary Examiner—Georgia Epps
Assistant Examiner—Tim Thompson
Attorney, Agent, or Firm—Trop, Prunner, Hu & Miles, P.C.

[57] ABSTRACT

Lens distortion may be corrected using a least squares curve fitting method to determine a straight line approximation for the curvature caused by lens distortion. An image made of a rectangular shape formed from a series of circles may be utilized as the target for a picture which may be taken to calibrate for lens distortion. The deviation of each of the straight lines caused by the lens distortion can be calculated assuming that the optical axis is centered on the image. The presumed optical axis can be adjusted towards the sides of the rectangle with the lower values of distortion coefficient. When the lines agree the optical axis has been located. The deviation is measured perpendicularly from a best fit straight line approximation.

20 Claims, 3 Drawing Sheets

CORRECTING LENS DISTORTION

BACKGROUND

This invention relates generally to correcting lens distortion.

A number of lens aberrations are specified by one coefficient in a series expansion. See M. Born and E. Wolf, *Principles of Optics* 6th Edition, Cambridge University Press (1998). These aberrations include spherical aberration, coma, astigmatism, curvature of field and distortion.

To varying degrees, camera lenses are subject to distortion. One class of such distortion errors gives rise to barrel and pincushion distortions. These distortions involve a bulging in the center of the image caused by irregularities in the lens manufacturing process. Barrel distortion has a negative distortion coefficient while pincushion distortion has a positive distortion coefficient. As a result of barrel distortion, a square or rectangular image bows outwardly to produce a resulting image which is barrel shaped. Thus, barrel distortion occurs when the coefficient of the appropriate series expansion is a nonzero value.

Digital cameras may include algorithms for correcting the barrel/pincushion distortion. Typically a third order warping transformation is used to determine the amount of curvature resulting from the distortion and to create a corrected image which closely models the actual exposed image. Generally, these techniques involve exposing a square or rectangular shape and determining the amount of curvature that results from the distortion. The third order warping transformation is used to convert the curved sides back to their square or rectangular shape. Through calibration, the distortion can be decreased.

However, with existing techniques, the accuracy may not be sufficient to enable two dimensional stitching. In addition, it may be difficult to accurately determine the amount of lens distortion. It may also be difficult to determine whether or not one has correctly located the optical axis of the lens. Thus, there is a continuing need for improved techniques for correcting for lens distortion.

SUMMARY

In accordance with one aspect, a method of evaluating lens distortion includes using a least squares equation to curve fit a line to the curvature of an image caused by lens distortion. The least squares equation is solved for the minimum deviation of the best fit line from that curvature. The deviation is measured in a direction perpendicular to the best fit line.

In accordance with another aspect, a method of determining the location of the optical axis of a lens includes calculating the lens distortion coefficient for each side of a closed geometrical shape. The lens distortion coefficient is applied until a miinimum deviation is achieved for each side. Next, a determination is made as to whether the lens distortions parameters for the sides are substantially equal.

DETAILED DESCRIPTION

Figure 1:
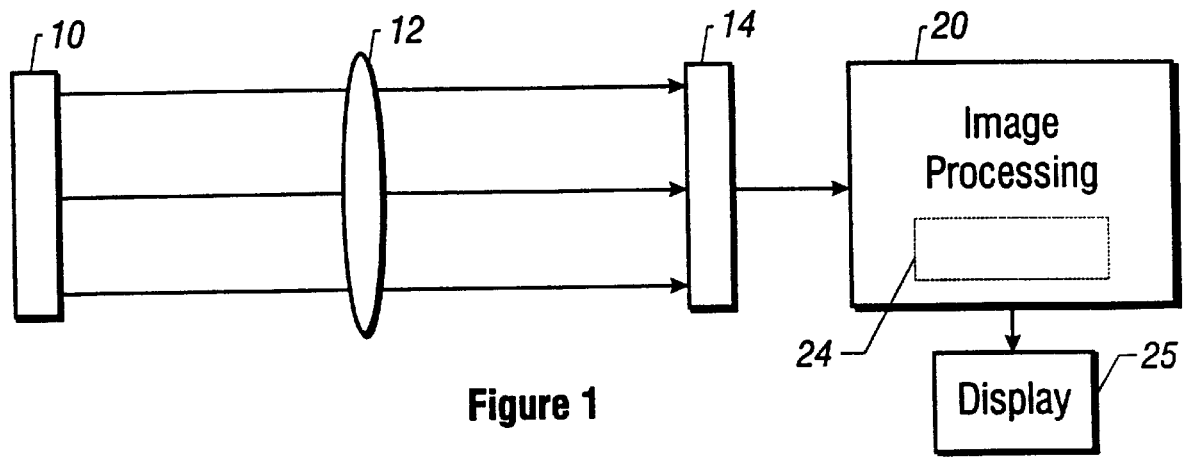
FIG. 1 is a schematic view of a lens system.
Figure 2:
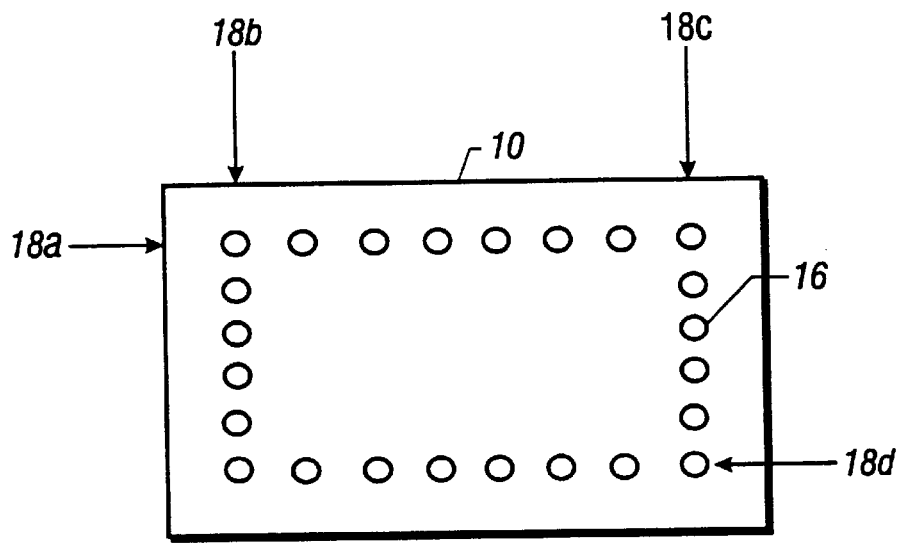
FIG. 2 is a depiction of a rectangle which may be imaged by the lens system.

Referring to FIG. 1, a lens system includes a target 10, a lens 12, and an imaging array 14. The target 10 may include a plurality of circles 16 arranged in a square or rectangular pattern, as shown in FIG. 2. As a result of lens distortion, the rectangular pattern shown in FIG. 2 appears on the imaging array 14 as the curved, barrel shaped pattern shown in FIG. 3. The distortion may be corrected by applying a warping transformation to return the distorted image to the actual rectangular pattern, prior to viewing by the user. While barrel distortion is illustrated, the same techniques may be used to correct other distortions, such as pincushion distortion.

While the present invention is described with respect to a rectangular pattern of circles 16, other closed geometric shapes could be used including squares, triangles, trapezoids and the like.

The target 10 provides a test pattern to determine the extent of lens distortion of the lens, for example, during a calibration process. The calibration process determines a value of the lens distortion coefficient which can be applied through a well known warping transformation to cause the user to perceive an image which is free of lens distortion. Advantageously, the correction is sufficiently accurate to allow two dimensional image stitching.

Initially, a picture is taken of the target 10. It does not matter if the camera is not pointed straight at the target 10. Even if the camera is tilted, the off axis orientation only introduces a perspective distortion which preserves the straight lines. The distorted rectangle formed from the circles 16 becomes a general quadrilateral which can be handled as well as the simple rectangle.

The centroid of each circle 16 is calculated by conventional techniques to yield one point per circle, denoted $(x_i, y_i)$ for the $i^{th}$ circle. The centroid coordinates are not sensitive to digitization noise around the edges of the circles.

Figure 3:
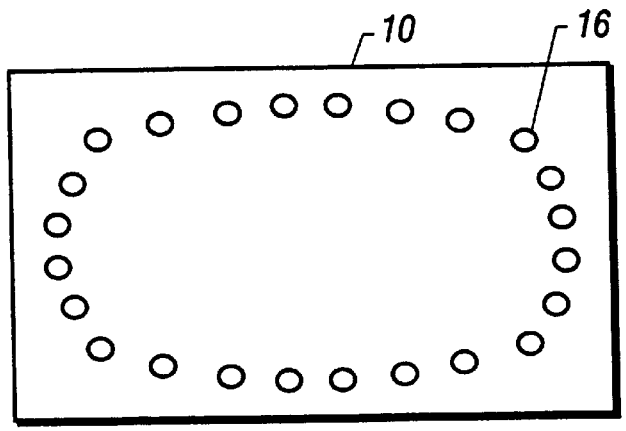
FIG. 3 is the pattern shown in FIG. 2 as seen through a distorted lens.

Using the centroids for all the circles on each of the lines 18a through 18d, the deviation D from straightness for each line is computed for the image on the imaging array 14 (FIG. 3). The calculation of deviation is rotationally invariant so precisely the same result is obtained if the person performing the calibration has held the camera in a position that is rotated about its axis. In addition, the deviation is accurate for lines that are vertical or near vertical for which other calculations are less accurate.

The following equations are used to find the deviation D of the centroids from a best fit line approximation for the curvature caused by lens distortion. The least squares equation is solved for that line which most closely follows the curvature caused by the lens distortion. Namely, the equation is solved for the minimum deviation of the best fit line from that curvature, the deviation being measured in a direction perpendicular to the best fit line.

Assuming N equals the number of points on a line:

$$D_\pm = \frac{M_{xx} - 2L_\pm M_{xy} + L_\pm^2 M_{yy}}{2(1 + kL_\pm)}$$

where:
$$M_{xx} = \sum_{i=1}^{N} x_i^2 - \frac{1}{N}\left(\sum_{i=1}^{N} x_i\right)^2$$

$$M_{xy} = \sum_{i=1}^{N} x_i y_i - \frac{1}{N}\sum_{i=1}^{N} x_i \sum_{i=1}^{N} y_i$$

$$M_{yy} = \sum_{i=1}^{N} y_i^2 - \frac{1}{N}\left(\sum_{i=1}^{N} y_i\right)^2$$

$$k = \frac{M_{xx} - M_{yy}}{2M_{xy}}$$

$$L_\pm = k \pm \sqrt{k^2 + 1}$$

The deviation from straightness is measured by D which is equal to the minimum of ($D_+$, $D_-$). If $M_{xy}$ is a zero, then the deviation is equal to the minimum of ($M_{xx}$, $M_{yy}$).

The distance of the centroids to a best fit line is determined in the direction perpendicular to the as yet unknown best fit line. A best fit solution can be found without knowing in advance the correct direction along which to measure the distances.

Figure 4:
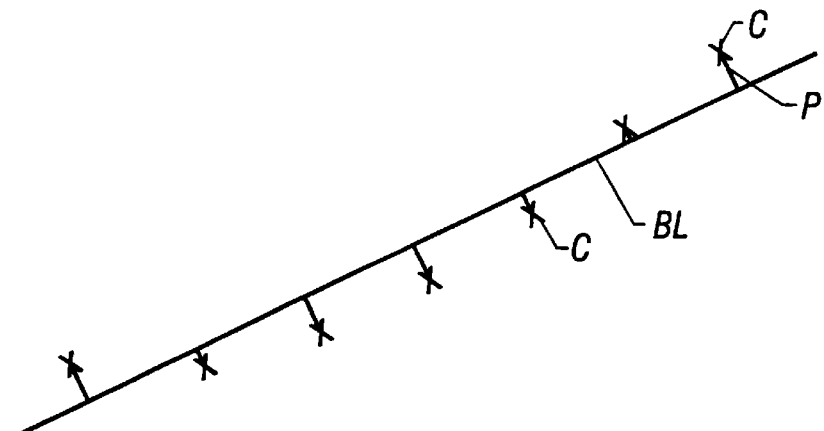
FIG. 4 is a sketch showing how the distance from the centroids is measured to the best line.

An illustrative arrangement of centroids "C" is shown in FIG. 4. A best line "BL" is shown passing through the centroids C. The distance from the centroids C to the best line "BL" is measured along the direction "P" perpendicular to the best line BL, even though this direction is not known in advance. As a result, the same best line is always derived, even if the camera has been rotated by the user. The equations set forth above produce the deviation D, which is the deviation of the given points from the best fit line.

Using these deviations, and assuming that the optical axis is centered in the image, a conventional distortion correction is repeatedly applied to the image using different values of the distortion coefficient. When one of the lines 18 achieves the minimum deviation D as a flnction of the distortion coefficient, this is assumed to be the correct distortion coefficient for application to a warping transformation. This process is implemented separately for each of the four lines 18 to get four separately computed values of the lens distortion coefficient.

If the assumption that the optical axis is centered in the image is incorrect, the four calculated values of the distortion coefficient will not agree. This provides an easy way to determine the location of the optical axis which is critical to correcting for lens distortion. If the calculated values for each of the lines 18 do not agree, a point close to the image center is selected as the new presumed optical axis and the calculations of the distortion coefficient are repeated to get four new values. The presumed optical axis is adjusted repeatedly until the values for the top and bottom lines 18a and 18d in the original shape agree, as do the left and right lines 18b and 18c.

When moving the presumed optical axis, the search can be guided by the four values of the distortion coefficient. That is, the presumed optical axis can be moved towards the sides of the rectangle with lower values of the distortion coefficient. For example, if the left side 18b has a lower value than the right side 18c, and the top side 18a has a higher value than bottom side 18d, the presumed optical axis should be moved towards the left and bottom sides of the rectangle. In this way, it is possible to converge on the real optical axis in a defined way.

Figure 5:
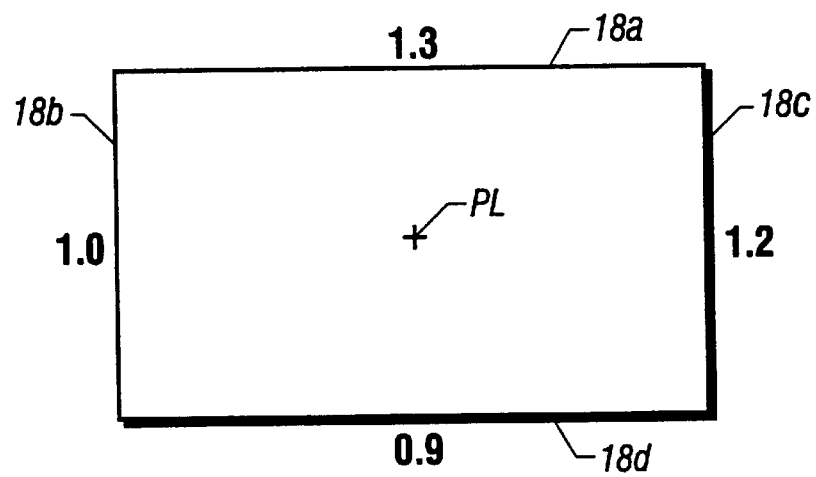
FIGS. 5 and 6 are illustrations of the technique for locating the true optical axis.

FIG. 5 shows an image with hypothetical distortion coefficients of 1.3, 1.0, 1.2, and 0.9 for the sides 18a–d. The left side 18b has a smaller value than the right side 18c, while the bottom side 18d has a smaller value than the top side 18a.

Figure 6:
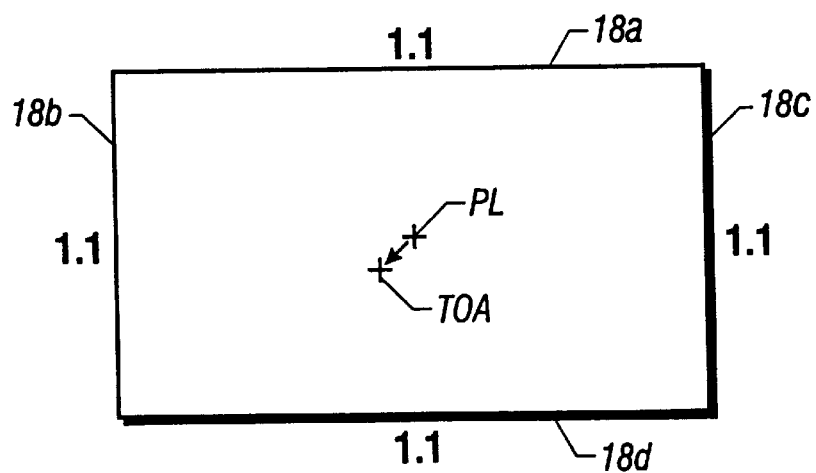

The true optical axis "TOA", is located by shifting its presumed location "PL" horizontally and vertically towards the sides with the smaller calculated values of the distortion parameter, as shown in FIG. 6. When the values of the distortion coefficient (1.1) are substantially equal, the optical axis is located.

After these procedures have been completed, one has the distortion coefficent and the location of the optical axis in the image. It is then a straightforward, conventional operation to correct the lens distortion.

Due to digitization noise, there may be some variation in the lens correction coefficients. Thus, the process can be repeated for a set of images of the same target pictures. The images with the lowest 20% and highest 20% of the lens distortion coefficient may be discarded. The remaining coefficients for lens correction may then be averaged to develop a value used to correct the distortion. In this way, a sufficiently precise lens correction can be obtained and accurate two dimensional stitching is feasible.

These techniques may be implemented by software 26 (FIG. 7) used to calibrate the image processor 20. The software can be stored in magnetic or semiconductor memory 24. The corrected image may be viewed on the display 25.

Figure 7:
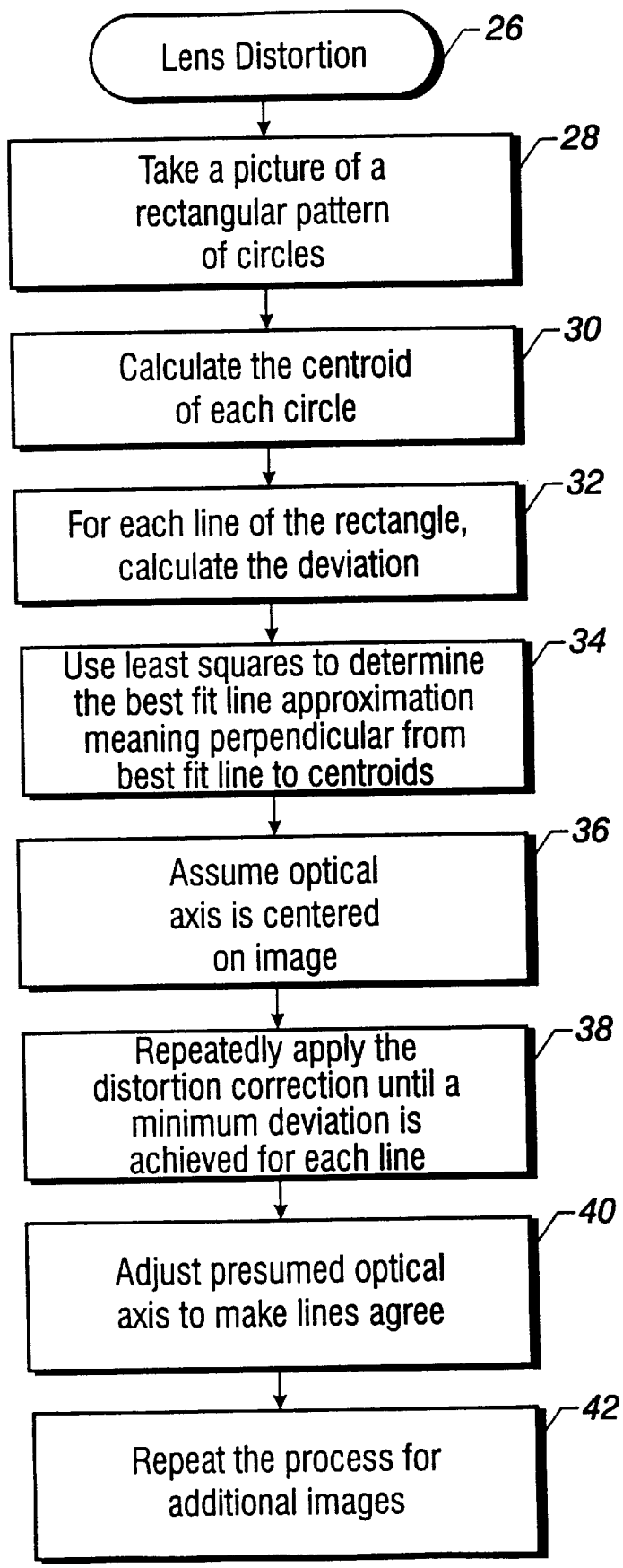
FIG. 7 is a flow diagram for the lens correction software.

Referring to FIG. 7, after a picture is taken of a rectangular pattern of circles (block 28), the flow begins with the calculation of the centroids (block 30) of the circles forming the lines 18. Next, the deviation of each line caused by lens distortion is determined (block 32). Using a least squares approach, a best fit line approximation for the curvature is determined and the deviation is measured perpendicularly from the best fit line. (block 34).

The optical axis is located by assuming an optical axis centered on the image (block 36). The distortion correction is applied repeatedly until a minimum distortion is achieved for each line (block 38). The presumed optical axis is shifted to make the lines agree (block 40). The process is repeated for additional images (block 42).

Embodiments of the present invention may be advantageous since the lens distortion curvature may be determined regardless of how the camera is oriented to the imaged object. Likewise, some embodiments may advantageously allow the optical axis to be located.

While the present invention has been described with respect to a single preferred embodiment, those skilled in the art will appreciate numerous modifications and variations therefrom. It is intended that the appended claims cover all such modifications and variations as fall within the true spirit and scope of the present invention.

What is claimed is:

1. A method of evaluating lens distortion comprising:
   taking a picture of a rectangular pattern of closed geometric shapes;
   using an equation to curve fit a line to the curvature caused by the lens distortion; and
   solving the equation for the minimum deviation of the best fit line from that curvature, the deviation being measured in a direction perpendicular to the best fit line.

2. The method of claim 1 including talking a picture of a rectangular pattern of circles and using a least squares equation to curve fit a line to the curvature caused by lens distortion.

3. The method of claim 1 including using a plurality of serially arranged circles to create the rectangular pattern.

4. The method of claim 3 including calculating the centroid of each circle.

5. The method of claim 4 including calculating the deviation of each line of the rectangle.

6. The method of claim 5 including assuming the optical axis is centered on the image.

7. The method of claim 5 including applying a lens distortion correction until the minimum deviation is achieved for each line of the rectangle.

8. The method of claim 7 including adjusting the presumed optical axis to make the deviations substantially equal.

9. The method of claim 8 including repeating the process for additional images.

10. A method for determining the location of the optical axis of a lens comprising:

determining the lens distortion coefficients for each side of a closed geometrical shape having sides;

applying the lens distortion coefficient until a minimum deviation is achieved for each side; and determining whether the lens distortion coefficients for the sides are substantially equal.

11. The method of claim 10 including assuming the optical axis is centered on the image.

12. The method of claim 11 including correcting for the true position of the optical axis by picking a new presumed optical axis displaced towards a side with a lower value of the lens distortion coefficient than another side.

13. An element comprising a machine readable storage medium storing instructions that cause a computer to:

calculate the centroid of a circle, use a least squares equation to determine a best fit line approximation for the curvature caused by lens distortion; and solve the least squares equation for the minimum deviation of the best fit line from that curvature, the deviation being measured in a direction perpendicular to the best fit line.

14. An element comprising a machine readable storage medium storing instructions that cause a computer to:

calculate the lens distortion coefficients for each side of a closed geometrical shape;

apply the lens distortion coefficients until a minimum deviation is achieved for each side; and determine whether the lens distortion coefficients for the sides are substantially equal.

15. A method of evaluating lens distortion comprising:

determining a best fit line approximation for the curvature caused by lens distortion;

solving the equation for the minimum deviation of the best fit line from that curvature, the deviation being measured in a direction perpendicular to best fit line;

applying a lens distortion correction until the minimum deviation is achieved for each line; and adjusting the presumed optical axis to make the deviation substantially equal.

16. The method of claim 15 including taking a picture of a rectangular pattern of circles and using a least squares equation to curve fit a line to the curvature caused by lens distortion.

17. The method of claim 16 including using a plurality of serially arranged circles to create the rectangular pattern.

18. The method of claim 17 including calculating the centroid of each circle.

19. The method of claim 18 including calculating the deviation of each line of the rectangle.

20. The method of claim 15 including repeating the process for additional images.

* * * * *

UNITED STATES PATENT AND TRADEMARK OFFICE
CERTIFICATE OF CORRECTION

PATENT NO. : 6,002,525
DATED : December 14, 1999
INVENTOR(S) : RICHARD J. POULO and WALTER L. GORMAN It is certified that error appears in the above-identified patent and that said Letters Patent is hereby corrected as shown below:

In column 4, line 64, please replace "talking" with --taking--.

Signed and Sealed this

Eighteenth Day of July, 2000

Attest:

Q. TODD DICKINSON

*Attesting Officer*     *Director of Patents and Trademarks*